Feb. 24, 1970  D. L. SHORT  3,496,644
INTERNAL MEASURING DEVICE TO DETERMINE PIPE CURVATURE
Filed Oct. 5, 1967  2 Sheets-Sheet 1
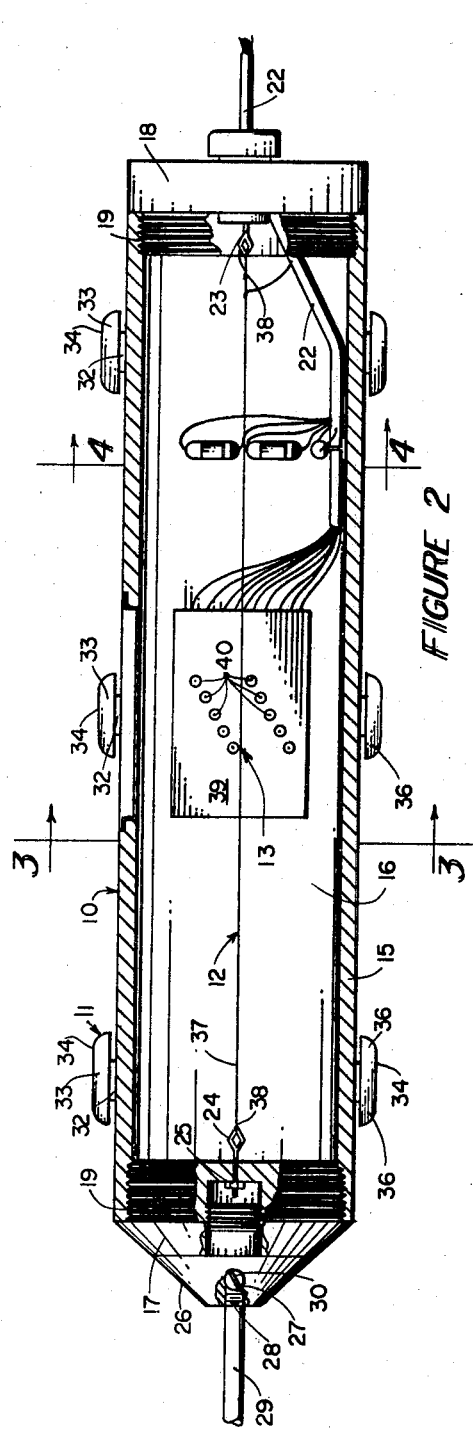
Don L. Short, INVENTOR.
BY
ATTORNEY Feb. 24, 1970  D. L. SHORT  3,496,644
INTERNAL MEASURING DEVICE TO DETERMINE PIPE CURVATURE
Filed Oct. 5, 1967  2 Sheets-Sheet 2
FIGURE 3
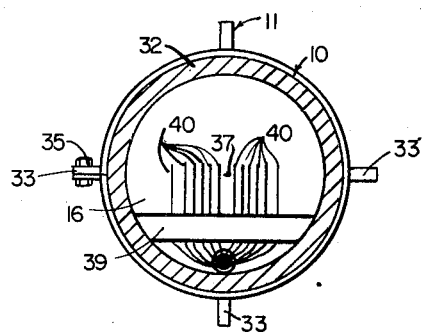
FIGURE 4
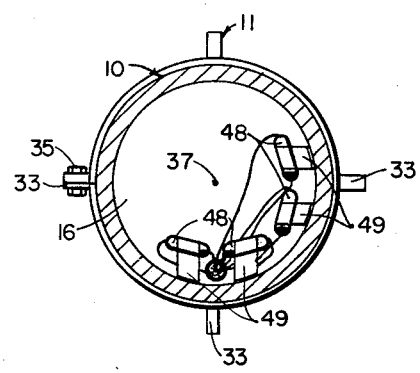
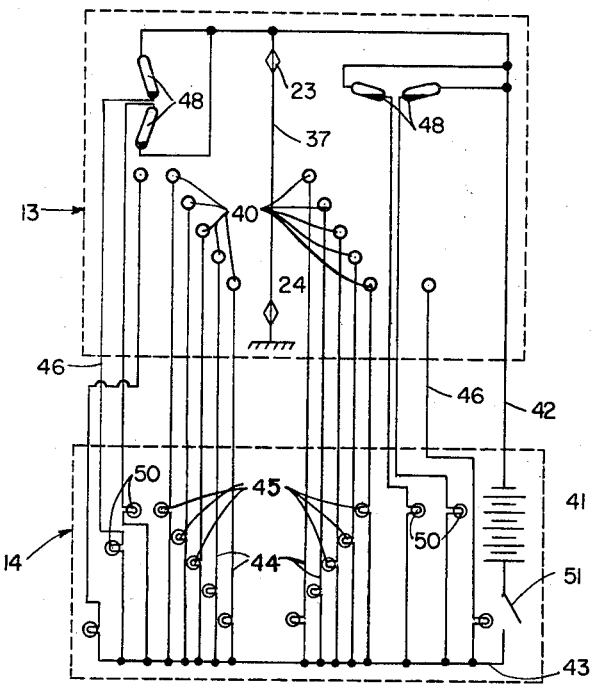
FIGURE 5
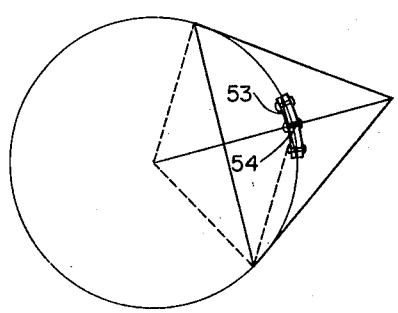
FIGURE 6
Don L. Short, INVENTOR
BY
ATTORNEY United States Patent Office 3,496,644
Patented Feb. 24, 1970

3,496,644
INTERNAL MEASURING DEVICE TO DETERMINE
PIPE CURVATURE
Don L. Short, 2420 S. Rainier St.,
Kennewick, Wash. 99336
Filed Oct. 5, 1967, Ser. No. 673,169
Int. Cl. G01b 3/00; G01c 9/00; E21b 47/02
U.S. Cl. 33—174                                    5 Claims

ABSTRACT OF THE DISCLOSURE

An elongate elastic tube for insertion within a pipe to measure pipe curvature by determining the deviation of a chord through medial forward and rearward points of said tube from a straight line extending therebetween. Measurement of such deviation is accomplished electrically by communication of the chord with laterally spaced sensing contacts to cause display of the event at a distance from the measuring device. The device is particularly adapted to accurately measure deviations, in either a vertical or horizontal plane, of relatively short length of uniformly sized pipe of a substantially horizontal orientation.

BACKGROUND OF THE INVENTION

Field of invention

This invention relates generally to an internal measuring device to determine the course of a hidden pipeline and more particularly to such a device that moves within the pipe to determine its curvature in a known plane by successively measuring deviation of a chord through the device from a straight line and sensibly displaying such information at a distance.

Description of prior art

Various pipes, particularly those embedded within the earth, are hidden from surface view and oftentimes change their course after placement because of earth motion or other causes. It is oftentimes necessary to know the course of such pipelines in space and various devices to make this determination have become known.

Such devices may generally be divided on a functional basis into a first class intended primarily to determine the orientation of a substantially vertically oriented pipe and a second class to determine the orientation of a substantially horizontal pipe.

Devices of the first class generally depend upon gravity, fluid pressure, or a non-rigid mechanical linkage, especially as in an oil well, to propel them vertically downward through the pipe to be measured. Such devices generally measured pipe course by determination of its curvature at linearly spaced points by gravity oriented means or some secondary physical characteristic associated with the pipe curvature—such as differential flow of fluid about the curves. In the second class of devices propulsion through a pipe has generally been caused by some self-carried propelling means frictionally engaging the pipe, pressure of fluid flowing through the pipe, or other similar non-rigid mechanical means. Again, with this second class, course, in general has been determined by some physical constant necessarily associated with gravity or the means of propulsion both of which determinors may involve substantial error.

The instant invention is distinguished from this art in that it provides an elongate, elastically deformable, non-gravity orientated measuring device slideably moveable through the pipe to be measured by a rigid mechanical linkage adapted to positively determine the position of the measuring device in the pipe. The deviation of the pipe in a particular plane is measured by determining the deviation of the medial portion of a chord through the bent tube from the straight axis, and the course of the pipe in space is determiner by a plurality of successive planar orientated curve measurements related to the lineal position thereof along the pipe. This provides a much simpler, more reliable and more accurate means of determining pipe position than that provided by the known measuring devices aforesaid.

SUMMARY OF THE INVENTION

The instant invention was conceived to provide an elastic measuring device to determine the course of a hidden pipe by positional insertion therein with subsequent determination of curvature at a particular point by measurement of deviation of a chord through the medial end points of the curved measuring device from the straight axis therebetween.

This function is accomplished by provision of a straight elongate elastically deformable tube having external runners adapted to maintain the tube slideably in the pipe to be measured, with the axis of the two in coincidence. A rigid mechanical linkage, such as a rod, is attached to the measuring device to move it through the pipe and determine its linear position therein.

A chamber is defined within the tube by opposed ends. A wirelike electric conductor communicates between the ends and within this chamber from the point where the axis of the measuring device would intersect each of the ends, so that the conductor is coincident with the normal straight axis of the measuring device. A sensing unit is provided in the center of the tube, embodying a plurality of spaced contacts on both sides of the axial conductor so that as the tube be bent the conductor will move in the direction of curvature and this movement may be determined by conductor communication with one of the aforesaid contacts.

Electrical circuitry is provided to display at a distance from the measuring device the particular contact status. Level sensitive switches are provided to determine tube orientation and thereby the plane of curvature of the pipe in question. With these measurements, by well known mathematical analysis, the course of the pipe in space may be determined.

The device is particularly adapted to measure horizontally orientated short lengths of pipe of relatively uniform internal configuration such as commonly encountered in nuclear reactors and similar facilities. The sensitivity of the device obviously is limited by reason of its discrete rather than continuous types measurement, but from the principal states this sensitivity may be made quite great.

In providing such a structure, it is:

A principal object of my invention to provide a measuring device to determine the course of a pipe by measuring deviation of a chord of a curve from a straight line at a plurality of known positions within a pipe.

A further object of my invention to provide such a device that is not gravity oriented, nor dependent upon measurement of any secondary physical characteristics which might increase errors of measurement.

A further object of my invention to provide a device of the nature aforesaid that is of new and novel design, of sturdy and durable nature, of simple and economic manufacture and one that is otherwise well adapted to the uses and purposes for which it is intended.

Other and further objects of my invention will appear from the following specification and accompanying drawings which form a part of this application. In carrying out the objects of my invention, however, it is to be understood that its essential features are susceptible of change in design and structural arrangements with only one preferred, practical embodiment being illustrated in the accompanying drawings, as required.

BRIEF DESCRIPTION OF DRAWINGS

In the accompanying drawings, wherein like numbers of reference refer to similar parts throughout:

FIGURE 1 is a orthographic surface view of my invention in measuring position within a pipe partially cut-away to show the invention.

FIGURE 2 is a somewhat enlarged elongate cross-sectional view of the measuring device of FIGURE 1, taken on the line 2—2 thereon in the direction indicated by the arrows.

FIGURE 3 is a transverse, orthographic cross-sectional view of the measuring device of FIGURE 2, taken on the line 3—3 thereon in the direction indicated by the arrows, to show particularly the curvature sensing means.

FIGURE 4 is a transverse cross-sectional view of the measuring device of FIGURE 2, taken on the line 4—4 thereon, in the direction indicated by the arrows, to show particularly the level sensing switches of the device and their positioning.

FIGURE 5 is an electrical diagram, in normal symbology, showing the means of indicating the condition of the measuring device at any particular time.

FIGURE 6 is a semi-diagrammatic view of my device as it would appear when measuring a curve, showing the essential geometry relating to the measurements.

DESCRIPTION OF THE PREFERRED EMBODIMENT

Referring now to the drawings in more detail and particularly to those of FIGURES 1 and 2, it will there be seen that my invention comprises generally elongate body structure 10 adapted to be maintained in axial alignment within a pipe by external aligning structure 11 and operatively carrying within its central chamber chord wire 12 adapted to cooperate with sensing structure 13 communicating with display structure 14 to measurably communicate to the display structure the arcuate nature of body 10, when it be so configured.

Body 10 includes a relatively elongate, preferably cylindrical, tubular structure 15 defining chamber 16 therein. The end portions of tube 15 are internally threaded to receive the external threaded portions 19 of forward end cap 17 and rearward end cap 18 to enclose chamber 16 in a fashion to prevent entry of external matter. Central entrance panel 20 is provided to allow access to the sensing structure 13 carried in the central portion of the tube. This panel is held in position by lip structure 21 formed in both central panel and tube periphery thereabout to cooperate with the aligning band structure to releasably maintain the panel in closed position.

Rearward end cap 18 is provided with wire orifices 22 to allow exit of electrical control wires therethrough. On its inner surface it carries chord wire fastening device 23, preferably having an inwardly extending apex type structure adapted to align a wire carried thereby with the axis of tube 15. Forward end cap 17 has a similar fastening device 24 again preferably having a similar aligning apex. Preferably forward chord wire fastener 24 is maintained in cap 17 by an adjustable means 25, such as the threaded shaft and nut combination illustrated, to allow adjustable tensioning of the chord wire.

The outer facing portion of forward end cap 17 is preferably configured with truncated conic surface 26 to aid passage of the device through a pipe. The central portion of this cap is provided with an internally threaded chamber 27 adapted to threadedly accept the externally threaded portion 28 of elongate moving rod 29. A set screw 30 threadedly extends through the side portion of conic element 26 into engagement with the mounting rod to releasably maintain the rod in the forward end cap and prevent accidental dislodgment during use.

Tube 15 is preferably formed from symmetrical tubular stock of an elastically deformable nature so that the tube will conform to curved configuration of a pipe with the application of reasonable forces thereto. The tube should be uniform in nature so that its flexation might be uniform. A plastic or thin walled metallic tube admirably suits these requirements.

External aligning structure 11 includes split annular fastening bands 32 mounting on their external surfaces plural runners 33 with outward surfaces 34 adapted to fit immediately inwardly adjacent the inner surface of the pipe to be measured. The fastening bands are split, preferably between two immediately adjacent runners 33a, and joined by nut-bolt combinations 35 for simple releasable positioning. Preferably ends 36 of the runners are rounded to aid in simple insertion of the device within a pipe. Because of the nature of the device it is critical to my invention that the fastening bands 32 and runners 33 be properly configured to axially align tube 15 within a pipe, and this requires a proper sizing and configuration of the structure and an individual configuring for pipe or differing size.

Preferably an aligning structure is positioned slightly inwardly of each of the ends of the body, and a third structure in the middle, though depending upon the diameter of the device, its length and the nature of materials from which it is constructed, it may be necessary to provide more or less aligning structures to prevent any local deviation of the axis of body structure 10 from that of a pipe surrounding it, when in a curved condition.

Conductor chord 12 is an elongate, electrically conductive wire of some tensile strength having central body portion 37 and end loops 38 positioned at such distance as to allow the wire to be mounted between fastening devices 23, 24 with some tension. A steel wire of commerce, such as that commonly used in piano strings, suits these requirements.

Sensing structure 13 is seen in FIGURES 2 and 3 to embody base block 39 mounted within chamber 16 of body structure 10 upon the inside surface of tube 15 with plural position-determining contacts 40 extending inward therethrough sufficiently to potentially contact chord wire 12 upon appropriate lateral movement relative the contacts. Contacts 40 are formed from an elastic, electrically conductive, resiliently deformable wire and are positioned within base block 39 in appropriate spacial configuration preferably by adhesive fastening. The contacts are arranged in a spaced fashion both outwardly from the axis of body structure 10 as defined by chord wire 12 and in a spaced relationship parallel to this axis so that if one inner wire be deformed by chord wire 12, it will not make electrical contact with other laterally outward wires, but only with chord wire 12. A steel wire of the nature commonly used in piano strings also fulfills these requirements.

The electrical sensing and display structure is shown bestly in FIGURE 5. This form of display requires wire communications between the sensing structure 13 and an external display unit; it is most simple but obviously other types of display mechanisms might be used with the principles of my invention, if not so simply, and efficiently.

Here chord wire 12 is an electrical conductor, insulated from the body structure preferably by the insulating nature of end caps 17, 18; similarly each of plural contacts 40 are electrically insulated from each other and body structure 10 preferably by the insulating nature of base block 39.

A source of electrical energy 41 communicates by line 42 with chord wire 12. The other terminal of energy source 41 communicates in series with parallel laterals 44, each communicating in series through indicator lights 45 and one of the plural positioning contacts 40. With this circuitry then, when body structure 10 is arcuately configured and the central portion of chord wire 12 moved laterally, the outwardmost extent of its travel will be indicated, both as to direction and distance, by the light associated with the outermost contact 40.

The most lateral contact point 40a communicates through laterals 46 to out-of-limit lights 47 and thence line 43 to power source 41 to indicate an arcuate positioning of body structure 10 without the measuring limits of sensing structure 13.

Paired cooperating level sensitive switches 48, preferably of the mercury type, are provided at an angular distance of ninety degrees apart to indicate the rotary positioning of body structure 10. These switches are mounted on the inner surface of tube 15 by appropriate brackets 49, preferably near one of the ends of the tube so that access thereto may be had through one of the end caps. Preferably the switches are initially positioned to indicate a horizontal level with sensing structure 13 in the position illustrated in FIGURE 3. Each of these level switches communicate in series from line 42 through plural level lights 50 and thence to line 43 so that if the device be tipped from a level position, the particular light in the direction of tilt will be activated to indicate the condition.

Preferably a control switch 51 is provided in line 43, or elsewhere as desired, to deactivate the circuitry immediately adjacent the power source when the device is not in use. Preferably a display panel carrying the various condition-indicating lights is located at some distance from body structure 10 so that it might be readily observable by a user.

Having thusly described the structure of my invention, its operation may be understood.

A device is constructed according to the specifications set forth and attached to a rigid moving rod of appropriate length to accomplish the measurements desired. The device is inserted within the channel of pipe 31 to be measured. The lineal position of the device within the pipe is determined from the moving rod, preferably by use of a measuring scale carried thereon.

The rotary position of the body structure is then properly oriented, either vertically or horizontally, by manual manipulation and the chord position determined in either or both planes at spaced points. The chord position is determined by the outermost lighted light on either one or the other side of the measuring chord wire 12. Since the various contacts associated with each indicating light were positioned at predetermined distance from the normal central position of the chord wire the numerical value of this position is known, within limits. This operation may be repeated at many discrete points throughout the length of the pipe to be measured and the course of the pipe in space mutually determined therefrom.

Most generally the deviation of a pipe may be determined directly from the offset readings indicated, if they be appropriately lineally spaced, as these readings will indicate the offset at a particular point in the pipeline midway between the two ends of elongate body 10. If desired, however, the degree of curvature or other geometrical quantities associated with the pipe structure may be determined as illustrated in FIGURE 6, where it is seen that the length of chord line 53 and of offset line 54 will both be known and that the various other associated geometrical quantities may be determined by well known mathematical analysis therefrom.

It is to be noted from the method of measuring course heretofore described, that the measuration is discrete rather than continuous; this offers little problem in dealing with accuracy as the spaced distance between contacts 40 may be quite small and a spacing of some few thousandths of an inch between these contacts will normally provide quite as much accuracy as desired.

It is further to be noted that in determining the course of a pipe the method of so doing requires the accumulation of individual measurements, each based upon the foregoing, and that this type of measurement gives rise to an accumulation of error in the system. By reason of this, the system is adapted particularly for the measurement of reasonably short pipe lengths of some few hundred feet.

It is further to be noted that the sensing system involved is not gravity oriented and has no essential relationship to the direction of gravity. It is also to be noted that the position of the device along a pipe is positively determined by measuration upon the control rod and that this quantity is not subject to any errors caused by uncontrollable variance or discrepancies in operative conditions.

The foregoing description of my invention is necessarily of a detailed nature so that a specific embodiment of it might be set forth, as required, but it is to be understood that various modifications of detail, rearrangement and multiplication of parts may be resorted to without departing from its spirit, essence or scope.

Having thusly described my invention, what I desire to protect by Letters Patent, and

What I claim is:

1. In an internal device for determination of the course of a pipe in space the combination of:
   an elongated support means sufficiently flexible and dimensioned to conform to the curvature of said pipe when disposed therein; a chord line of predetermined length extending in a substantially straight line between two spaced points on said support means on the axis of said pipe when disposed in said pipe;
   a sensing device adapted to determine the lateral displacement of the medial portion of the chord line from the axis of the pipe at that point comprising a plurality of resiliently deformable contacts on said support means in spaced lateral positions of potential abutment with said chord line, said contacts being spaced at predetermined distances laterally from the axial position of said chord line and in a dimension parallel thereto to uniquely determine the position of said chord line in one plane;
   means for moving said support means through said pipe and for determining its lineal position therealong; and
   means responsive to the abutment of said chord line with each of said contacts for displaying the displacement of the central portion of said chord line from its axial position to determine curvature of said pipe.

2. The invention of claim 1 wherein the means for moving said support means through a pipe and of determining the lineal position therealong comprises:
   an elongate rigid rod having means for communication with said support means.

3. The invention of claim 1 wherein said responsive means includes:
   a source of electrical energy in parallel with
   a plurality of circuits each having one of said plurality of switching contacts in series with a sensible indicator to indicate contact of the chord line with the contact touching the chord and most distal from the central chord position.

4. The invention of claim 1 further characterized by a level sensing means including:
   at least one level sensing switch associated with said elongate chord line to indicate the plane of orientation of said chord line and a straight line between its end points.

5. In a device for measuring the course of a pipeline in space from within said pipeline, the invention comprising, in combination:
   an elongate, elastically deformable body adapted to slideably fit within a pipe to be measured, defining an enclosed chamber;
   a central chord wire extending between two spaced points within the chamber of said body structure axially coincident with said pipe axis when said body is disposed in said pipe;
   sensing means associated with the medial portion of said chord wire to determine lateral displacement thereof from the axis of the body structure at its medial point, said means including:
- a base block carried within the chamber of said body,
- a plurality of resiliently deformable contacts projecting from said base block to a position of potential abutment with said chord line, said contacts being spaced at predetermined distances laterally from the normal position of said chord wire and in a dimension parallel thereto to uniquely determine the position of said chord line;

means of displaying the lateral displacement of said chord wire at a distance from said measuring body including:
a source of electrical energy in parallel with
a plurality of circuits each having one of said plurality of contacts in series with a sensible indicator to indicate abutment of said chord line with each of said contacts; and rigid mechanical means of moving the measuring body lineally through a pipe and determining its position therein.

References Cited
UNITED STATES PATENTS

| | | | |
|---|---|---|---|
| 3,323,216 | 6/1967 | Ublacker | 33—86 |
| 3,295,209 | 1/1967 | Young | 33—86 |
| 2,930,137 | 3/1960 | Arps | 33—205 |

SAMUEL S. MATTHEWS, Primary Examiner

U.S. Cl. X.R.

33—205